United States Patent
Sano

(10) Patent No.: US 12,466,942 B2
(45) Date of Patent: Nov. 11, 2025

(54) THERMOPLASTIC ELASTOMER COMPOSITION AND MOLDED ARTICLES THEREOF

(71) Applicant: MCPP Innovation LLC, Tokyo (JP)

(72) Inventor: Mayu Sano, Tokyo (JP)

(73) Assignee: MCPP Innovation LLC, Tokyo (JP)

( * ) Notice: Subject to any disclaimer, the term of this patent is extended or adjusted under 35 U.S.C. 154(b) by 664 days.

(21) Appl. No.: 17/872,052

(22) Filed: Jul. 25, 2022

(65) Prior Publication Data

US 2022/0372265 A1 Nov. 24, 2022

Related U.S. Application Data

(63) Continuation of application No. PCT/JP2021/000338, filed on Jan. 7, 2021.

(30) Foreign Application Priority Data

Jan. 30, 2020 (JP) .................................. 2020-013855
Oct. 13, 2020 (JP) .................................. 2020-172653

(51) Int. Cl.
*C08L 23/12* (2006.01)
*C08L 53/02* (2006.01)
*C08L 83/04* (2006.01)

(52) U.S. Cl.
CPC ............... *C08L 23/12* (2013.01); *C08L 53/02* (2013.01); *C08L 83/04* (2013.01); *C08L 2205/03* (2013.01)

(58) Field of Classification Search
CPC ...... C08L 23/12; C08L 53/02; C08L 2201/10; C08L 2207/04; C08L 23/10; C08L 23/14; C08L 53/025; C08L 91/00; C08L 83/04; C08L 2205/03; C08L 53/00; C08G 77/80
See application file for complete search history.

(56) References Cited

U.S. PATENT DOCUMENTS

2006/0160951 A1* 7/2006 Mori .................. C08L 53/025
525/100
2008/0161485 A1 7/2008 Suzuki et al.
2013/0209787 A1* 8/2013 Eguchi .................. C08L 83/04
524/505
2014/0213728 A1 7/2014 Kosaka et al.
2019/0309157 A1 10/2019 Karube

FOREIGN PATENT DOCUMENTS

| CN | 1793220 A | 6/2006 |
|---|---|---|
| CN | 101128492 A | 2/2008 |
| CN | 103025822 A | 4/2013 |
| CN | 106632926 A | 5/2017 |
| CN | 110072939 A | 7/2019 |
| EP | 1674525 A1 | 6/2006 |
| EP | 2581412 A1 | 4/2013 |
| JP | H08-176353 A | 7/1996 |
| JP | 2006-083323 A | 3/2006 |
| JP | 2006-199930 A | 8/2006 |
| JP | 2014-37532 A | 2/2014 |
| WO | 2007/009871 A2 | 1/2007 |
| WO | 2008/051261 A2 | 5/2008 |

OTHER PUBLICATIONS

Extended European Search Report issued in corresponding European Patent Application No. 21747972.4 dated May 22, 2023.
Office Action issued in corresponding Chinese Patent Application No. 202180011814.3 dated Nov. 28, 2023.
International Search Report issued in related International Patent Application No. PCT/JP2021/000338 dated Mar. 9, 2021.

* cited by examiner

*Primary Examiner* — Alicia Bland
(74) *Attorney, Agent, or Firm* — Morgan, Lewis & Bockius LLP

(57) ABSTRACT

The present invention provides a thermoplastic elastomer composition that can form a molded article having excellent feel and transparency and to provide a molded article thereof. A thermoplastic elastomer composition comprising components (A) to (C), listed below,
component (A): a propylene-based polymer;
component (B): a block copolymer and/or a hydrogenated product thereof, the block copolymer including at least two polymer blocks P and at least one polymer block Q, the at least two polymer blocks P primarily including aromatic vinyl compound units, the at least one polymer block Q primarily including conjugated diene compound units; and
component (C): an aryl-group-containing organopolysiloxane.

17 Claims, No Drawings

THERMOPLASTIC ELASTOMER COMPOSITION AND MOLDED ARTICLES THEREOF

TECHNICAL FIELD

The present invention relates to a thermoplastic elastomer composition and molded articles thereof.

BACKGROUND ART

Thermoplastic elastomers soften and have flowability when heated and have rubber elasticity when cooled. Thermoplastic elastomers have molding processability similar to that of thermoplastic resins, have a unique rubber elasticity, and can be recycled. For these reasons, thermoplastic elastomers are widely used, and examples of the uses include those in automotive parts, building components, medical components, wire cover materials, and sundries.

Patent Literature 1 discloses a thermoplastic elastomer composition for injection molding, which is a so-called styrenic elastomer. The thermoplastic elastomer composition includes a block copolymer and a hydrogenated block copolymer obtained by hydrogenating the block copolymer, the block copolymer being formed of at least one polymer block A and at least one polymer block B, the polymer block A primarily including an aromatic vinyl compound, the polymer block B primarily including a conjugated diene compound. The thermoplastic elastomer composition further includes a propylene-based block copolymer. Patent Literature 1 states that the styrenic elastomer can be used in an automotive interior component.

Patent Literature 2 states that a silicone oil having a viscosity (JIS Z 8803, 25° C.) of 100,000 centistokes (cSt) or greater is used with a styrenic or olefinic rubber in a thermoplastic elastomer composition, and the use of the silicone oil makes it possible to improve a low-temperature impact property and surface scratch resistance while maintaining mechanical strength.

PTL 1: JP 2006-83323 A
PTL 2: JPH 08-176353 A

In recent years, a high-quality feel and comfort for automotive interior spaces have been desired. Accordingly, it is required that skins of automotive interior components such as, typically, armrests, console pads, and the like, have a good appearance and feel.

Furthermore, automotive interior spaces having various designs are increasing, and, therefore, from the standpoint of design, it is required that materials, too, have decorative properties. In general, the decorative properties of thermoplastic resins depend on the transparency of the resin, and the more transparent the resin, the better the decorative properties thereof.

Unfortunately, molded products in which either of the thermoplastic elastomer compositions described in Patent Literature 1 and Patent Literature 2 is used have insufficient transparency.

SUMMARY OF INVENTION

Objects of the present invention are to provide a thermoplastic elastomer composition that can form a molded article having excellent feel and transparency and to provide a molded article thereof.

The present inventor discovered that by including a specific organopolysiloxane in a thermoplastic elastomer composition, it is possible to provide a molded article having excellent feel and transparency. The thermoplastic elastomer composition includes a propylene-based polymer and includes a block copolymer and/or a hydrogenated product thereof, the block copolymer includes at least two polymer blocks P and at least one polymer block Q, the polymer blocks P primarily includes aromatic vinyl compound units, and the polymer block Q primarily includes conjugated diene compound units.

Specifically, a summary of the present invention lies in the following [1] to [5].

[1] A thermoplastic elastomer composition comprising components (A) to (C), listed below,
   component (A): a propylene-based polymer;
   component (B): a block copolymer and/or a hydrogenated product thereof, the block copolymer including at least two polymer blocks P and at least one polymer block Q, the at least two polymer blocks P primarily including aromatic vinyl compound units, the at least one polymer block Q primarily including conjugated diene compound units; and
   component (C): an aryl-group-containing organopolysiloxane.

[2] The thermoplastic elastomer composition according to [1], wherein the component (C) is an aralkyl-group-containing organopolysiloxane.

[3] The thermoplastic elastomer composition according to [2], wherein the component (C) is an aralkyl-group-containing organopolysiloxane including repeating units represented by formula (1) below,

[Chem. 1]

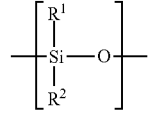

general formula (1)

where $R^1$ represents a hydrocarbon group having 1 to 18 carbon atoms, and $R^2$ represents an aralkyl group having 7 to 12 carbon atoms.

[4] A thermoplastic elastomer composition according to [3], wherein $R^1$ is a methyl group.

[5] A molded article in which the thermoplastic elastomer composition according to any one of [1] to [4] is used.

Furthermore, a summary of the present invention lies in the following <1> to <7>.

<1> A thermoplastic elastomer composition including components (A) to (C), listed below:
   component (A): a propylene-based polymer;
   component (B): a block copolymer and/or a hydrogenated product thereof, the block copolymer including at least two polymer blocks P and at least one polymer block Q, the at least two polymer blocks P primarily including aromatic vinyl compound units, the at least one polymer block Q primarily including conjugated diene compound units; and
   component (C): an aralkyl-group-containing organopolysiloxane having, in the molecule thereof, repeating units represented by formula (1) below.

[Chem. 2]

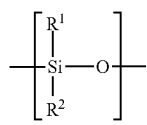

general formula (1)

where $R^1$ represents a hydrocarbon group having 1 to 18 carbon atoms, and $R^2$ represents an aralkyl group having 7 to 12 carbon atoms.

<2> The thermoplastic elastomer composition according to <1>, wherein the component (C) is an aralkyl-group-containing organopolysiloxane having, in the molecule thereof, the repeating units represented by formula (1) and repeating units represented by formula (2) below.

[Chem. 3]

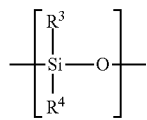

general formula (2)

In formula (2), $R^3$ and $R^4$ each independently represent an organic group having 1 to 18 carbon atoms.

<3> The thermoplastic elastomer composition according to <1> or <2>, wherein $R^1$ is a methyl group.

<4> The thermoplastic elastomer composition according to <3>, wherein $R^3$ and $R^4$ are each independently an alkyl group having 1 to 3 carbon atoms.

<5> The thermoplastic elastomer composition according to <4>, wherein $R^3$ and $R^4$ are a methyl group.

<6> The thermoplastic elastomer composition according to any one of <1> to <5>, wherein, in the component (B), the aromatic vinyl compound units are styrene units, and the conjugated diene compound units are butadiene units.

<7> A molded article in which the thermoplastic elastomer composition according to any one of <1> to <6> is used.

ADVANTAGEOUS EFFECTS OF INVENTION

With the present invention, a thermoplastic elastomer composition that can form a molded article having excellent feel and transparency can be provided, and a molded article thereof can be provided.

DESCRIPTION OF EMBODIMENTS

Embodiments of the present invention will be described in detail below. The present invention is not limited to the following description and can be modified and practiced in any manner that is consistent with the scope of the present invention.

In this specification, when numerical values or physical property values are expressed by using "to" with preceding and following numbers, it is to be understood that the preceding and following numbers are included.

[Thermoplastic Elastomer Composition]

A thermoplastic elastomer composition of the present invention includes components (A) to (C), listed below, and may further include a component (D), listed below.

component (A): a propylene-based polymer;
component (B): a block copolymer and/or a hydrogenated product thereof (which may hereinafter be referred to as a "(hydrogenated) block copolymer"), the block copolymer including at least two polymer blocks P and at least one polymer block Q, the at least two polymer blocks P primarily including aromatic vinyl compound units, the at least one polymer block Q primarily including conjugated diene compound units;
component (C): an aryl-group-containing organopolysiloxane; and
component (D): a hydrocarbon-based softening agent for a rubber <Mechanism>

The thermoplastic elastomer composition of the present invention has an effect of being able to form a molded article having excellent feel and transparency.

Although details of the reasons for the effect of the thermoplastic elastomer composition of the present invention are not clear, some inferences are made as follows.

In general, a thermoplastic elastomer composition including a propylene-based polymer, which is the component (A), and a (hydrogenated) block copolymer, which is the component (B), microscopically has a so-called sea-island structure, which is a structure in which multiple islands formed of the component (B) are present in a sea formed of the component (A).

When such a sea-island structure formed of the component (A) and the component (B) further includes the component (C) therein, there is a tendency for the component (B) to be finely dispersed easily in the sea formed of the component (A). As a result, presumably, dispersed particles of the component (B) having a dispersed diameter smaller than the optical wavelengths of visible light increase, which improves the transparency of the elastomer composition of the present invention.

Furthermore, the aryl group present in the component (C) interacts with the aromatic group of the aromatic vinyl compound units present in the component (B), which makes it more likely that a large proportion of the component (C) is located near or around the component (B). As a result, it is more likely that a large amount of the component (C) is disposed at the interfaces between the component (A) and the component (B). As a result, presumably, scattering of light at the interfaces between the component (A) and the component (B) is inhibited, which improves transparency.

<Component (A)>

In the propylene-based polymer that serves as the component (A) (which may be hereinafter referred to as a "propylene-based polymer (A)") used in the present invention, it is sufficient that propylene units, be present in an amount greater than or equal to 50 mass % in the monomer units that form the propylene-based polymer (A). From the standpoint of heat resistance, rigidity, crystallinity, chemical resistance, and the like, it is preferable that the content percentage of propylene units in the propylene-based polymer (A) be greater than or equal to 60 mass %. The content percentage is more preferably greater than or equal to 75 mass % and even more preferably greater than or equal to 90 mass %. The upper limit of the content percentage of propylene units is not particularly limited and may be 100 mass %.

The content of the propylene units in the component (A) and the content of each of the structural units of the other copolymer components, which will be described below, can be determined by using infrared spectroscopy.

The type of the propylene-based polymer (A) is not particularly limited. Specifically, the propylene-based polymer (A) may be a propylene homopolymer, a propylene-ethylene copolymer (for example a propylene-ethylene random copolymer, a propylene-ethylene block copolymer) And any of these may be used for the propylene-based polymer (A).

A melt flow rate (JIS K7210, 230° C., a load of 21.2 N) of the propylene-based polymer (A) is not particularly specified and is typically 0.05 to 200 g/10 minutes. The melt flow rate is preferably 0.05 to 100 g/10 minutes and more preferably 0.1 to 80 g/10 minutes. When the melt flow rate is within the above range, good moldability is achieved, and, mechanical properties, particularly, a tensile strength at break can be controlled within a desirable range.

Regarding a catalyst that is used in the production of the propylene-based polymer (A), non-limiting preferred examples of the catalyst include stereoregular catalysts. Examples of the stereoregular catalysts include, but are not limited to, Ziegler catalysts and metallocene catalysts.

Among these catalysts, metallocene catalysts are preferable.

Examples of the Ziegler catalysts include, but are not limited to, two-component catalysts and three-component catalysts. The two-component catalysts may be ones that include a transition metal component and an organometallic component, the transition metal component may be, for example, a titanium halide compound, such as titanium trichloride, titanium tetrachloride, or trichloroethoxytitanium, or a contact product of the titanium halide compound and a magnesium compound, which may typically be magnesium halide, and the organometallic component may be, for example, an alkylaluminium compound, a halide thereof, a hydride thereof, or an alkoxide thereof. The three-component catalysts may be ones that include, in addition to any of the foregoing components, an electron-donating compound containing nitrogen, carbon, phosphorus, sulfur, oxygen, silicon, or the like.

Examples of the metallocene catalysts include, but are not limited to, catalysts made of a Group 4 transition metal compound and a co-catalyst, with an optional component being an organoaluminium compound. The Group 4 transition metal compound may be one containing a ligand having a cyclopentadienyl skeleton (a so-called metallocene compound). The co-catalyst may be one that can react with the metallocene compound to be activated to a stable ionized state. Any of known metallocene catalysts may be used. The metallocene compound is preferably a crosslinkable metallocene compound that enables stereoregular polymerization of propylene and more preferably a crosslinkable metallocene compound that enables stereoregular isotactic polymerization of propylene.

A method for producing the propylene-based polymer (A) may be performed in the presence of the catalyst described above, and examples of the method include slurry methods that use an inert solvent, solution methods, vapor phase methods that substantially do not use a solvent, and bulk polymerization methods that use a polymerization monomer as a solvent. For example, in the case of a slurry method, the polymerization may be carried out in an inert hydrocarbon or a liquid monomer. Examples of the inert hydrocarbon include n-butane, isobutane, n-pentane, isopentane, hexane, heptane, octane, cyclohexane, benzene, toluene, and xylene. A polymerization temperature is typically −80 to 150° C. and preferably 40 to 120° C. Preferably, a polymerization pressure is 1 to 60 atm. A molecular weight of the resulting propylene-based polymer (A) can be adjusted by using hydrogen or a different known molecular weight regulator. The polymerization is performed by using a continuous or batch reaction, and the conditions for the polymerization may be conditions that are typically used. The polymerization reaction may be a single-stage reaction or a multi-stage reaction.

The propylene-based polymer (A) may be a commercially available product. Examples of the commercially available product include a polypropylene block copolymer manufactured by SunAllomer Ltd. and Novatec (registered trademark) PP and WAYMAX (registered trademark), manufactured by Japan Polypropylene Corporation.

One propylene-based polymer (A) may be used alone, a propylene-based polymer (A) having a copolymer composition may be used, or a mixture of two or more propylene-based polymers (A) having different physical properties and the like may be used.

<Component (B)>

The component (B) used in the present invention is a (hydrogenated) block copolymer, the block copolymer including at least two polymer blocks P (which may hereinafter be referred to simply as "blocks P") and at least one polymer block Q (which may hereinafter be referred to simply as a "block Q"), the at least two polymer blocks P primarily including aromatic vinyl compound units, the at least one polymer block Q primarily including conjugated diene compound units.

As used herein, the expression "primarily including" means that a polymer block of interest includes monomer units of interest in an amount of 50 mole % or greater.

The aromatic vinyl compound that forms the blocks P are not particularly limited. Examples of the aromatic vinyl compound include styrene, α-methylstyrene, p-methylstyrene, divinylbenzene, 1,1-diphenylethylene, N,N-dimethyl-p-aminoethylstyrene, and N,N-diethyl-p-aminoethylstyrene. Among these, styrene, α-methylstyrene, and p-methylstyrene are preferable from the standpoint of availability and productivity. Styrene is more preferable.

The blocks P may be formed of one type of aromatic vinyl compound unit or formed of two or more types of aromatic vinyl compound units. The blocks P may include monomer units other than vinyl aromatic compound units.

The conjugated diene compound that forms the block Q is a diolefin having a pair of conjugated double bonds. Examples of the conjugated diene compound include, but are not limited to, 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. Among these, 1,3-butadiene and isoprene are preferable from the standpoint of productivity. 1,3-butadiene is more preferable.

The block Q may be formed of one type of conjugated diene compound unit or formed of two or more types of conjugated diene compound units. The block Q may include monomer units other than conjugated diene compound units.

The block polymer having at least two blocks P and at least one block Q may be linear, branched, radial, and/or the like.

It is preferable that the block copolymer is a block copolymer represented by formula (I) or (II) below.

$$P-(Q-P)m \qquad (I)$$

$$(P-Q)n \qquad (II)$$

In the formulae, P represents the block P, Q represents the block Q, m represents an integer of 1 to 5, and n represents an integer of 1 to 5.

In instances where a plurality of blocks P and a plurality of blocks Q are present, the compound units in the plurality of blocks may be the same as or different from one another.

From the standpoint of the rubber elasticity of the composition, it is preferable that the component (B) is a block copolymer represented by formula (I). The component (B) is more preferably a block copolymer represented by formula (I) in which m is 3 or less, even more preferably a block copolymer represented by formula (I) in which m is 2 or less, and particularly preferably a block copolymer represented by formula (I) in which m is 1.

The component (B) may be a hydrogenated product of the block copolymer including the blocks P and the block Q. In this instance, it is preferable that the component (B) is a hydrogenated product of a block copolymer represented by formula (I); the component (B) is more preferably a hydrogenated product of a block copolymer represented by formula (I) in which m is 3 or less, even more preferably a hydrogenated product of a block copolymer represented by formula (I) in which m is 2 or less, and particularly preferably a hydrogenated product of a block copolymer represented by formula (I) in which m is 1.

The content percentage of the blocks P in the block copolymer that serves as the component (B) is preferably greater than or equal to 5 mass %, more preferably greater than or equal to 10 mass %, even more preferably greater than or equal to 15 mass %, and particularly preferably greater than or equal to 20 mass %.

The content percentage of the blocks P in the block copolymer that serves as the component (B) is preferably less than or equal to 70 mass %, more preferably less than or equal to 60 mass %, even more preferably less than or equal to 50 mass %, and particularly preferably less than or equal to 40 mass %.

As the proportion of the blocks P increases within the above range, the mechanical strength tends to be high. As the proportion P decreases within the above range, flexibility tends to be high and the bleeding tends to decrease. The above range tends to make the mechanical strength compatible with the flexibility while suppressing bleeding.

In the block copolymer that serves as the component (B), a proportion of the block Q may be large, which is preferable in terms of the flexibility of the thermoplastic elastomer composition and a reduced likelihood of bleeding thereof, or the proportion may be small, which is preferable in terms of the mechanical strength thereof.

A content percentage of the block Q in the block copolymer that serves as the component (B) is preferably greater than or equal to 30 mass %, more preferably greater than or equal to 40 mass %, even more preferably greater than or equal to 50 mass %, and particularly preferably greater than or equal to 60 mass %.

The content percentage of the block Q in the block copolymer that serves as the component (B) is preferably less than or equal to 95 mass %, more preferably less than or equal to 90 mass %, even more preferably less than or equal to 85 mass %, and particularly preferably less than or equal to 80 mass %.

As the proportion of the block Q increases within the above range, the flexibility tends to be high, and the bleeding tends to decrease. As the proportion Q decreases within the above range, the mechanical strength tends to be high. The above range tends to make the mechanical strength compatible with the flexibility while suppressing bleeding.

A weight average molecular weight (Mw) of the (hydrogenated) block copolymer that serves as the component (B) is preferably greater than or equal to 10,000 and more preferably greater than or equal to 30,000 and is preferably less than or equal to 800,000, more preferably less than or equal to 650,000, and even more preferably less than or equal to 500,000.

In these ranges, the Mw of the (hydrogenated) block copolymer that serves as the component (B) may be large, which is preferable in terms of heat resistance and mechanical strength, or the Mw may be small, which is preferable in terms of a molding appearance, flowability, and moldability. When the Mw of the (hydrogenated) block copolymer that serves as the component (B) is within any of the above-mentioned ranges, the resulting thermoplastic elastomer composition has excellent heat resistance, mechanical strength, molding appearance, flowability, and moldability.

Mw is a weight average molecular weight measured by gel permeation chromatography (which may be hereinafter abbreviated as "GPC") under the following conditions and calculated with polystyrene standards.

(Measurement Conditions)

Instrument: 150C ALC/GPC, manufactured by Nihon Millipore K.K.

Column: AD80M/S, manufactured by Showa Denko K.K. (3 columns)

Detector: MIRANIA, an infrared spectrophotometer manufactured by Foxboro Company Wavelength: 3.42 μm Solvent: o-dichlorobenzene Temperature: 140° C.

Flow rate: 1 cm$^3$/minute

Injection volume: 200 microliters

Concentration: 2 mg/cm$^3$ 0.2 mass % 2,6-di-tert-butyl-p-phenol is added as an antioxidant.

Preferred examples of the component (B) include styrene-butadiene-styrene block copolymers and hydrogenated products thereof; styrene-isoprene/butadiene-styrene block copolymers and hydrogenated products thereof.

The component (B) may be a commercially available product. Specific examples of a commercially available product include Kraton (registered trademark) G, manufactured by Kraton Corporation, Septon (registered trademark), manufactured by Kuraray Co., Ltd., Tuftec (registered trademark) and S.O.E. (registered trademark), manufactured by Asahi Kasei Corp., and Taipol (registered trademark), manufactured by TSRC Corporation.

For the component (B), one (hydrogenated) block copolymer may be used alone, or a mixture of two or more (hydrogenated) block copolymers may be used.

<Component (C)>

The aryl group of the aryl-group-containing organopolysiloxane that serves as the component (C) used in the present invention is an aryl group in a broad sense, which may be a heteroaryl group. Examples of the aryl group include phenyl groups, naphthyl groups, tolyl groups, xylyl groups, pyridyl groups, pyrimidinyl groups, and thienyl groups. It is sufficient that the aryl-group-containing organopolysiloxane be a compound having an aryl group. The aryl group may be included in the aryl-group-containing organopolysiloxane via a linking group, such as an alkylene group. Examples of such an aryl-group-containing group include arakyl groups. That is, the aryl-group-containing organopolysiloxane may be an aralkyl-group-containing organopolysiloxane.

The use of the aryl-group-containing organopolysiloxane with the component (A) and the component (B) can improve a feel while maintaining the transparency of the thermoplastic elastomer composition of the present invention.

The aryl-group-containing organopolysiloxane is more preferably an aryl-group-containing organopolysiloxane having, in the molecule thereof, repeating units represented by formula (1A) below.

[Chem. 4]

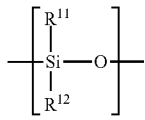

general formula (1A)

In formula (1A), $R^{11}$ and $R^{12}$ are each independently a hydrogen atom or an optionally substituted hydrocarbon group having 1 to 20 carbon atoms. At least one of $R^{11}$ and $R^{12}$ is an aryl group or a group containing an aryl group. Both $R^{11}$ and $R^{12}$ may be an aryl group or a group containing an aryl group.

Preferably, $R^{11}$ may be a group that is the same as $R^1$ or $R^2$ of formula (1), shown below. Likewise, preferably, $R^{12}$ may be a group that is the same as $R^1$ or $R^2$ of formula (1), shown below.

In particular, it is preferable that the aryl-group-containing organopolysiloxane be an aralkyl-group-containing organopolysiloxane, because, in this case, the effect of maintaining transparency and improving a feel is further enhanced. More preferably, the aralkyl-group-containing organopolysiloxane is an aralkyl-group-containing organopolysiloxane having, in the molecule thereof, repeating units represented by formula (1) below.

[Chem. 5]

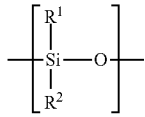

general formula (1)

In formula (1), $R^1$ represents a hydrocarbon group having 1 to 18 carbon atoms, and $R^2$ represents an aralkyl group having 7 to 12 carbon atoms.

In formula (1), $R^1$ is a hydrocarbon group having 1 to 18 carbon atoms, such as an alkyl group, examples of which include methyl groups, ethyl groups, propyl groups, butyl groups, pentyl groups, hexyl groups, heptyl groups, and octyl groups. Preferably, $R^1$ is an alkyl group having 1 to 3 carbon atoms, and more preferably, a methyl group.

$R^2$ is an aralkyl group having 7 to 12 carbon atoms, such as a phenylalkyl group, examples of which include benzyl groups, phenylethyl groups, phenylpropyl groups, and 2-phenylpropyl groups. From the standpoint of maintaining transparency and improving a feel, it is preferable that $R^2$ be a 2-phenylpropyl group.

It is preferable that the aralkyl-group-containing organopolysiloxane that serves as the component (C) be an aralkyl-group-containing organopolysiloxane having, in the molecule thereof, repeating units represented by formula (1) and repeating units represented by formula (2) below.

[Chem. 6]

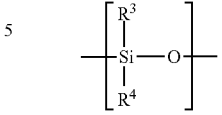

general formula (2)

In formula (2), $R^3$ and $R^4$ each independently represent an organic group having 1 to 18 carbon atoms.

Examples of the organic groups having 1 to 18 carbon atoms represented by $R^3$ and $R^4$ in formula (2) include alkyl groups, aryl groups, alkenyl groups, alkoxy groups, and epoxy groups. Specific examples include methyl groups, ethyl groups, propyl groups, butyl groups, hexyl groups, cyclohexyl groups, octyl groups, nonyl groups, decyl groups, dodecyl groups, tetradecyl groups, phenyl groups, methoxy groups, and ethoxy groups. From the standpoint of industrial availability, it is more preferable that $R^3$ and $R^4$ be each independently an alkyl group. Even more preferably, $R^3$ and $R^4$ are each independently an alkyl group having 1 to 3 carbon atoms, and particularly preferably, a methyl group.

A content percentage of the aryl groups of the aryl-group-containing organopolysiloxane that serves as the component (C) is preferably 1 to 60 mol %, more preferably 5 to 55 mol %, and even more preferably 5 to 50 mol %, relative to total moles of the organic groups linked to the silicon atoms. When the content percentage of the aryl groups is within any of the above-mentioned ranges, a thermoplastic elastomer composition having excellent transparency can be easily obtained.

Likewise, a content percentage of the aralkyl groups of the aralkyl-group-containing organopolysiloxane that serves as the component (C) is preferably 1 to 60 mol %, more preferably 5 to 55 mol %, and even more preferably 5 to 50 mol %, relative to the total moles of the organic groups linked to the silicon atoms. When the content percentage of the aralkyl groups is within any of the above-mentioned ranges, a thermoplastic elastomer composition having excellent transparency can be easily obtained.

A kinematic viscosity (25° C.) of the aryl-group-containing organopolysiloxane that serves as the component (C) used in the present invention is preferably greater than or equal to 1 cSt, more preferably greater than or equal to 5 cSt, and even more preferably greater than or equal to 10 cSt. The upper limit of the kinematic viscosity (25° C.) of the aryl-group-containing organopolysiloxane is not particularly limited and is preferably less than or equal to 1,500,000 cSt, more preferably less than or equal to 1,000,000 cSt, and even more preferably less than or equal to 500,000 cSt. In the above-mentioned ranges, as the kinematic viscosity increases, an effect of improving wear resistance increases. On the other hand, in the above-mentioned ranges, as the kinematic viscosity decreases, the transparency tends to become better, and in addition, an effect of reducing stickiness increases, so that a good feel can be provided. When the kinematic viscosity is within any of the above-mentioned ranges, a desired wear resistance, transparency, and effect of reducing stickiness can be achieved.

The component (C) may be a commercially available product. Specific examples of the commercially available product include KF-410 and X22-1877, manufactured by Shin-Etsu Chemical Co., Ltd.; Wacker (registered trademark) TN, manufactured by Wacker Asahikasei Silicone Co., Ltd.; and Xiameter (registered trademark) OFX-0203 and 0230 and Dowsil (registered trademark) SH 510, 550, and 710, manufactured by Dow Toray Co., Ltd.

For the component (C), one aryl-group-containing organopolysiloxane may be used alone, or two or more aryl-group-containing organopolysiloxanes may be used in combination.

<Component (D)>

The thermoplastic elastomer composition of the present invention may include, as the component (D), a hydrocarbon-based softening agent for a rubber. Including a hydrocarbon-based softening agent for a rubber is effective for improving flexibility and flowability of the thermoplastic elastomer composition of the present invention.

The hydrocarbon-based softening agent for a rubber may be a mineral-oil-based softening agent or a synthetic-resin-based softening agent; these agents have a high affinity for the component (B) and are, therefore, preferable. A mineral-oil-based softening agent is more preferable.

Typically, mineral-oil-based softening agents are mixtures of an aromatic hydrocarbon, a naphthenic hydrocarbon, and a paraffinic hydrocarbon. Oils in which 50% or more of all the carbon atoms are carbon atoms derived from a paraffinic hydrocarbon are referred to as paraffinic oils. Oils in which 30 to 45% of all the carbon atoms are carbon atoms derived from a naphthenic hydrocarbon are referred to as naphthenic oils. Oils in which 35% or more of all the carbon atoms are carbon atoms derived from an aromatic hydrocarbon are referred to as aromatic oils.

The hydrocarbon-based softening agent for a rubber used as the component (D) may be one of the softening agents mentioned above or a mixture of two or more of the softening agents.

Among these, paraffinic oils are preferable because paraffinic oils have a good hue.

Examples of the synthetic-resin-based softening agent include polybutene and low-molecular-weight polybutadiene.

A kinematic viscosity at 40° C. of the hydrocarbon-based softening agent for a rubber, as measured by a method according to JIS K 2283, is preferably greater than or equal to 20 cSt and more preferably greater than or equal to 50 cSt. The kinematic viscosity is preferably less than or equal to 800 cSt and more preferably less than or equal to 600 cSt.

In the above-mentioned ranges, the kinematic viscosity of the hydrocarbon-based softening agent for a rubber may be low, which is preferable in terms of improving the flowability of the thermoplastic elastomer composition of the present invention, or may be high, which is preferable in terms of a reduced likelihood of fogging and the like. When the kinematic viscosity is within any of the above-mentioned ranges, the occurrence of fogging and the like can be inhibited while ensuring the improvement of the flowability of the thermoplastic elastomer composition of the present invention.

<Mixing Ratio>

In the thermoplastic elastomer composition of the present invention, it is preferable that a content ratio of the component (A) be 1 to 99 mass %, and a content ratio of the component (B) be 99 to 1 mass %, relative to a total mass of the component (A) and the component (B) taken as 100 mass %. The content ratio of the component (A) is more preferably 5 to 95 mass %, even more preferably 10 to 90 mass %, and particularly preferably 25 to 80 mass %. The content ratio of the component (B) is more preferably 95 to 5 mass %, even more preferably 90 to 10 mass %, and particularly preferably 75 to 20 mass %.

In the thermoplastic elastomer composition of the present invention, a content of the component (C) is preferably 0.01 to 20 parts by mass, more preferably 0.05 to 20 parts by mass, even more preferably 0.1 to 15 parts by mass, particularly preferably 0.1 to 12 parts by mass, and still more preferably 0.5 to 12 parts by mass, per 100 parts by mass of the total of the component (A) and the component (B).

In instances where the thermoplastic elastomer composition of the present invention includes the component (D), a content of the component (D) is preferably 0 to 100 parts by mass, more preferably 0 to 90 parts by mass, even more preferably 0 to 85 parts by mass, and particularly preferably 0 to 80 parts by mass, per 100 parts by mass of the component (B).

When the thermoplastic elastomer composition of the present invention includes the propylene-based polymer that serves as the component (A) in an amount within any of the above-mentioned ranges, the effect of the component (A) of improving heat resistance and mechanical properties can be sufficiently produced while the effects of inclusion of the other components are also sufficiently produced.

When the thermoplastic elastomer composition of the present invention includes the (hydrogenated) block copolymer that serves as the component (B) in an amount within any of the above-mentioned ranges, heat resistance and oil resistance due to the component (B) can be sufficiently achieved while the effects of inclusion of the other components are also sufficiently produced.

When the thermoplastic elastomer composition of the present invention includes the aryl-group-containing organopolysiloxane that serves as the component (C) in an amount within any of the above-mentioned ranges, the effect of improving a feel while maintaining transparency can be sufficiently produced while the effects of inclusion of the other components are also sufficiently produced.

When the thermoplastic elastomer composition of the present invention includes the hydrocarbon-based softening agent for a rubber that serves as the component (D) in an amount within any of the above-mentioned ranges, the effect of the component (D) of improving flexibility and flowability can be sufficiently produced while the effects of inclusion of the other components are also sufficiently produced.

<Other Components>

In the thermoplastic elastomer composition of the present invention, components other than the components (A) to (D) (which may be referred to simply as "other components" in this specification) may be included as necessary provided that objects of the present invention are not impaired. Examples of the other components include resins and elastomers other than the components (A) and (B) (which may be collectively referred to simply as "other resins" in this specification) and various additives.

Examples of the other resins that may be included in the thermoplastic elastomer composition of the present invention include resins, such as polyolefin resins (excluding resins corresponding to the component (A)), polyester resins, polyamide resins, styrene resins (excluding resins corresponding to the component (B)), acrylic resins, polycarbonate resins, polyphenylene ether resin, and polyvinyl chloride resins; olefin-based elastomers, such as ethylene-propylene copolymer rubbers (EPM), ethylene-propylene-non-conjugated diene copolymer rubbers (EPDM), ethylene-butene copolymer rubbers (EBM), and ethylene-propylene-butene copolymer rubbers; polyamide-based elastomers, such as polyamide-polyol copolymers; polyvinyl chloride-based elastomers; polybutadiene-based elastomers; hydrogenated products of any of the foregoing, products obtained by modifying any of the foregoing with an acid anhydride or the like so that a polar functional group is incorporated therein; and products obtained by graft-, random- and/or block-copolymerizing any of the foregoing with another monomer. One of these other resins may be included, or two or more of them may be included.

Examples of the additives that may be included in the thermoplastic elastomer composition of the present invention include antioxidants, crystal nucleating agents, processing aids, such as lubricants, UV absorbers, light stabilizers, such as hindered amine-based compounds, hydrolysis resistant agents, coloring agents, such as pigments and dyes, antistatic agents, conductive agents, reinforcing agents, fillers, plasticizing agents (excluding agents corresponding to the component (D)), mold release agents, and foaming agents.

In the thermoplastic elastomer composition of the present invention, additionally using a polysiloxane other than the component (C) as a lubricant is effective. A polysiloxane is a component that imparts wear resistance to thermoplastic elastomer compositions and prevents the characteristic stickiness of elastomers. The type of a substituent attached to the siloxane backbone in the molecular structure of the polysiloxane is not particularly limited. Preferred polysiloxanes are dimethyl polysiloxanes (dimethyl silicones). A kinematic viscosity (25° C.) of the polysiloxane is preferably greater than or equal to 1 cSt, more preferably greater than or equal to 5 cSt, and even more preferably greater than or equal to 10 cSt. The upper limit of the kinematic viscosity is not particularly limited. As the kinematic viscosity of the polysiloxane increases, the effect of improving wear resistance increases, and as the kinematic viscosity decreases, the effect of reducing stickiness increases.

As referred to herein, the kinematic viscosity is a kinematic viscosity at 25° C. measured with an Ubbelohde viscometer in accordance with ASTM D445-46T (or JIS Z 8803).

In instances where the thermoplastic elastomer composition of the present invention includes a lubricant, such as a polysiloxane, a content of the lubricant is preferably 0.1 to 15 parts by mass and more preferably 0.1 to 10 parts by mass, per 100 parts by mass of the total of the component (A) and the component (B). A content of the lubricant of greater than or equal to 0.1 parts by mass is preferable from the standpoint of the effect of improving wear resistance and sticking resistance. A content of the lubricant of less than or equal to 15 parts by mass is preferable from the standpoint of mechanical strength, mold fouling, and the like.

Examples of antioxidants (heat stabilizers) that may be included in the thermoplastic elastomer composition of the present invention include hydroxylamine-based antioxidants, dithiocarbamic acid salt-based antioxidants, hindered phenolic antioxidants, sulfur-containing antioxidants, and phosphorus-containing antioxidants.

Preferably, the hydroxylamine-based antioxidants may be N,N-dialkyl hydroxylamines, examples of which include compounds represented by a formula of $R^a R^b NOH$ (where $R^a$ and $R^b$ each independently represent an alkyl). In the formula, $R^a$ or $R^b$ is preferably a dodecyl group, a tetradecyl group, a hexadecyl group, an octadecyl group, or a heptadecyl group. Particularly preferred dialkyl hydroxylamines are N,N-dioctadecylhydroxylamine, N,N-dihexadecylhydroxylamine, and mixtures of these. Examples of commercially available products include Irganox (registered trademark) 1010, manufactured by BASF.

Preferably, the dithiocarbamic acid salt-based antioxidants may be metal salts of dialkyl dithiocarbamic acid, and among these, nickel dialkyl dithiocarbamates is preferable. In particular, nickel dibutyl dithiocarbamate has a significant effect of improving heat aging resistance and is, therefore, preferable.

The hindered phenolic antioxidants may be those known in the art, and hindered phenolic antioxidants having a molecular weight of greater than or equal to 500, such as tetrakis[methylene-3-(3,5-di-t-butyl-4-hydroxyphenyl) propionate]methane, are preferable.

The sulfur-containing antioxidants are compounds containing sulfur. Examples of the compounds include thioether-based compounds, dithioic acid salt-based compounds, mercaptobenzimidazole-based compounds, thiocarbanilide-based compounds, and thiodipropionate-based compounds. Note that the compounds exclude compounds corresponding to dithiocarbamic acid salt-based antioxidants, which are mentioned above. Among these, thiodipropionate-based compounds are particularly preferable.

The phosphorus-containing antioxidants are compounds containing phosphorus. Examples of the compounds include phosphoric acids, phosphorous acids, hypophosphorous acid derivatives, phenylphosphonic acids, polyphosphonates, dialkyl pentaerythritol diphosphites, and dialkyl bisphenol A diphosphites.

The antioxidants may be used alone or in a combination of two or more.

In instances where the thermoplastic elastomer composition of the present invention includes an antioxidant, a content of the antioxidant is preferably 0.01 to 5 parts by mass per 100 parts by mass of the total of the component (A) and the component (B). A content of the antioxidant of greater than or equal to 0.01 parts by mass is preferable from the standpoint of the effect of improving heat aging resistance. A content of the antioxidant of less than or equal to 5 parts by mass is preferable from the standpoint of a reduced likelihood of problems such as bleeding, the mechanical strength of the composition, and the like.

The hindered amine-based light stabilizers are compounds having a hindered piperidine structure and may be those known in the art.

Examples of commercially available hindered amine-based light stabilizers include Tinuvin (registered trademark) series products, manufactured by BASF.

One hindered amine-based light stabilizer may be used alone, or a mixture of two or more hindered amine-based light stabilizers may be used.

In instances where the thermoplastic elastomer composition of the present invention includes a hindered amine-based light stabilizer, a content of the hindered amine-based light stabilizer is preferably 0.005 to 2 parts by mass and more preferably 0.01 to 0.5 parts by mass, per 100 parts by mass of the total of the component (A) and the component (B). When the content of the hindered amine-based light stabilizer is within any of the above-mentioned ranges, sufficient weatherability is exhibited, and the likelihood of bleeding onto a surface of a molded article is reduced. Accordingly, such a content is preferable.

It is preferable that a total content of the additives, such as the antioxidants mentioned above, in the thermoplastic elastomer composition of the present invention be less than or equal to 2 parts by mass per 100 parts by mass of the total of the component (A) and the component (B). More preferably, the total content is less than or equal to 1 part by mass.

<Method for Producing Thermoplastic Elastomer Composition>

Methods for producing the thermoplastic elastomer composition of the present invention are not particularly limited. For example, the thermoplastic elastomer composition of the present invention can be produced in accordance with a commonly used method, by dry-blending together the component (A), the component (B), the component (C), and the component (D) and other components that are optionally added and subsequently melt-kneading the blend.

In this instance, mixing apparatuses that may be used are not particularly limited, and examples thereof include kneading apparatuses, such as Banbury mixers, Labo Plastomills, single screw extruders, and twin screw extruders. In particular, in terms of productivity and good kneading properties, it is preferable that a melt-mixing method using an extruder be employed for the production.

A melting temperature for the kneading may be appropriately set. The melting temperature is typically within a range of 130 to 300° C. and preferably within a range of 150 to 250° C.

<Uses>

Uses of the thermoplastic elastomer composition of the present invention are not particularly limited. The thermoplastic elastomer composition is particularly useful as molding materials for automotive parts, building components, medical components, wire cover materials, sundries, and the like.

[Molded Articles]

The thermoplastic elastomer composition of the present invention can be molded to be used as various molded articles. The molding of the thermoplastic elastomer composition of the present invention can be performed by using any of a variety of molding methods, such as common injection molding methods and extrusion molding methods.

Specific examples of molded articles of the present invention, which are formed by molding the thermoplastic elastomer composition of the present invention, include injection-molded articles and extrusion-molded articles.

Molding conditions for injection-molding the thermoplastic elastomer composition of the present invention are as follows.

A molding temperature is typically 160 to 250° C. and preferably 170 to 220° C.

An injection pressure is typically 5 to 100 MPa and preferably 10 to 80 MPa.

A mold temperature is typically 10 to 80° C. and preferably 20 to 60° C.

Injection-molded articles formed by injection-molding the thermoplastic elastomer composition of the present invention can be fusion-bonded to a hard, olefinic resin, such as a propylene resin, and used as composite molded articles.

Molded articles of the present invention are useful as automotive parts, building components, medical components, wire cover materials, sundries, and the like. Molded articles of the present invention have a good appearance, feel, scratch resistance, and excellent flame retardancy. Accordingly, the molded articles are useful as skins of automotive interior components such as, typically, armrests, console pads, and the like.

EXAMPLES

Now, specific embodiments of the present invention will be described in further detail with reference to examples. The present invention is not limited to the following examples as long as the present invention is within the gist thereof.

The values of various production conditions and evaluation results in the following examples are to be understood as preferred upper or lower limit values of embodiments of the present invention, and preferred ranges may be a range defined by a combination of the upper or lower limit value and a value of an example described below or by a combination of values of examples described below.

In the following examples and comparative examples, the raw materials used in the preparation of the thermoplastic elastomer composition and the methods for evaluating the obtained thermoplastic elastomer composition are as follows.

[Raw Materials Used]

<Component (A)>

A-1: Novatec PP (registered trademark) BC06C, manufactured by Japan Polypropylene Corporation
  Propylene-ethylene block copolymer
  Content percentage of polypropylene units: 91 mass %
  MFR (JIS K 7210, 230° C., a load of 21.2 N): 60 g/10 minutes <Component (B)>

B-1: Taipol (registered trademark) 6159, manufactured by TSRC Corporation
  Hydrogenated product of styrene-butadiene-styrene block copolymer
  Weight average molecular weight: 400,000
  Content percentage of styrene units: 30 mass %

B-2: SOE-SS (registered trademark) 51605, manufactured by Asahi Kasei Corp.
  Hydrogenated product of styrene-butadiene-styrene block copolymer
  Weight average molecular weight: 200,000
  Content percentage of styrene units: 60 mass %

<Component (C)>

C-1: KF-410, manufactured by Shin-Etsu Chemical Co., Ltd.
  Aralkyl-group-containing organopolysiloxane having repeating units represented by formula (1) and repeating units represented by formula (2)
  $R^1$ in formula (1): methyl group
  $R^2$ in formula (1): 2-phenylpropyl group
  $R^3$ and $R^4$ in formula (2): methyl group
  Content percentage of aralkyl group: 39 mol %
  Kinematic viscosity (25° C.): 900 cSt <Component (D)>

D-1: Diana Process Oil PW90, manufactured by Idemitsu Kosan Co., Ltd.
  Paraffinic oil
  Kinematic viscosity (40° C.): 90 cSt <Component (X)>

X-1: BY27-001, manufactured by Dow Corning Toray Co., Ltd.
  Dimethyl polysiloxane masterbatch
  Content percentage of dimethyl polysiloxane: 50 mass %

X-2: KF96-1000CS, manufactured by Shin-Etsu Chemical Co., Ltd.
  Dimethyl polysiloxane
  Kinematic viscosity (25° C.): 1000 cSt <Other Additives>

E-1: Irganox (registered trademark) 1010, manufactured by BASF
  Hindered phenolic antioxidant

[Evaluations of Thermoplastic Elastomer Compositions]

<Feel>

Examination was performed on the injection-molded articles (350 mm×100 mm×2 mm) prepared from the pellets of the thermoplastic elastomer compositions obtained in Examples and Comparative Examples. Specifically, the feel of the injection-molded articles when touched by three fingers of a person in a stroking manner was examined, and evaluations were performed by using the following criteria.

Regarding the feel of the injection-molded articles, those that had no bleed on a surface and did not adhere to the hand are preferable, and those that had a dry feel are more preferable.
- A: There was a dry feel, and no adhering matter was perceived by the hand.
- B: There was a slightly dry feel, and no adhering matter was perceived by the hand.
- C: There was a sticky feel, or there was a dry feel, but adhering matter was perceived by the hand.

<Transparency: Total Light Transmittance>

A measurement was performed on the injection-molded articles (350 mm×100 mm×2 mm) prepared from the pellets of the thermoplastic elastomer compositions obtained in Examples and Comparative Examples. Specifically, a total light transmittance (unit: %) in a thickness direction was measured by using an NDH-2000 haze meter, manufactured by Nippon Denshoku Industries Co., Ltd.

Examples 1 to 4 and Comparative Examples 1 to 8

Raw materials were mixed together according to the formulations shown in Table-1. The resulting mixtures were each melt-kneaded in a twin-screw kneader (a cylinder temperature of 180° C. to 200° C.) to produce pellets of a thermoplastic elastomer composition. The obtained thermoplastic elastomer compositions were each injection-loaded into a sheet-shaped mold having a size of 350 mm (length)× 100 mm (width)×2 mm (thickness) at an injection speed of 40 mm/second by using an electric injection molding machine (manufactured by Sumitomo Heavy Industries, Ltd.), at a clamping force of 180 t, a cylinder temperature of 200° C., and a mold temperature of 40° C. After the completion of loading, the injection-molded articles were cooled for 30 seconds, and thereafter, the injection-molded articles were removed. The obtained injection-molded articles were evaluated for the feel and transparency. The results are shown in Table-1.

In Comparative Example 2, in which a dimethyl polysiloxane was included, the feel was excellent, but the transparency was degraded compared with Comparative Example 1.

In Example 1, as a result of the inclusion of a propylene-based polymer that serves as the component (A), a hydrogenated block copolymer that serves as the component (B), and an aryl-group-containing organopolysiloxane that serves as the component (C), the feel was excellent, and the transparency was also high compared with Comparative Example 2, in which a dimethyl polysiloxane was included. The transparency of Example 1 was substantially equal to that of Comparative Example 1, in which no polysiloxane was included.

In Comparative Examples 4, 5, and 8, in which a dimethyl polysiloxane was included, the feel was excellent, but the transparency was degraded compared with Comparative Example 3.

In Example 2, as a result of the inclusion of a propylene-based polymer that serves as the component (A), a hydrogenated block copolymer that serves as the component (B), and an aryl-group-containing organopolysiloxane that serves as the component (C), the feel was excellent, and the transparency was also high compared with Comparative Examples 4 and 5, in which a dimethyl polysiloxane was included. The transparency of Example 2 was substantially equal to that of Comparative Example 3, in which no polysiloxane was included.

In Comparative Example 7, in which a dimethyl polysiloxane was included, the feel was excellent, but the transparency was degraded compared with Comparative Example 6.

In Example 3, as a result of the inclusion of a propylene-based polymer that serves as the component (A), a hydrogenated block copolymer that serves as the component (B), and an aryl-group-containing organopolysiloxane that serves as the component (C), the feel was excellent, and the transparency was also high compared with Comparative Example 7, in which a dimethyl polysiloxane was included. The transparency of Example 3 was rather improved compared with Comparative Example 6, in which no polysiloxane was included.

TABLE 1

| | Categories | | Comparative Example 1 | Comparative Example 2 | Example 1 | Comparative Example 3 | Comparative Example 4 | Comparative Example 5 | Example 2 | Comparative Example 6 | Comparative Example 7 | Example 3 | Comparative Example 8 | Example 4 |
|---|---|---|---|---|---|---|---|---|---|---|---|---|---|---|
| Formulation amounts (parts by mass) | Component (A) | A-1 | 60 | 60 | 60 | 50 | 50 | 50 | 50 | 40 | 40 | 40 | 50 | 50 |
| | Component (B) | B-1 | 40 | 40 | 40 | 40 | 40 | 40 | 40 | 20 | 20 | 20 | 40 | 40 |
| | | B-2 | | | | 10 | 10 | 10 | 10 | 40 | 40 | 40 | 10 | 10 |
| | Component (C) | C-1 | | | 3 | | | | 3 | | | 3 | | 1 |
| | Component (X) | X-1 | | | | | | 6 | | | | | 5 | 5 |
| | | X-2 | | 3 | | | 3 | | | | 3 | | 1 | |
| | Component (D) | D-1 | 70 | 70 | 70 | 70 | 70 | 70 | 70 | 30 | 30 | 30 | 70 | 70 |
| | Component (E) | E-1 | 0.1 | 0.1 | 0.1 | 0.1 | 0.1 | 0.1 | 0.1 | 0.1 | 0.1 | 0.1 | 0.1 | 0.1 |
| Evaluation results | | Feel | C | B | B | C | A | A | A | C | A | A | B | A |
| | | Total light transmittance (%) | 70 | 53 | 69 | 60 | 48 | 52 | 59 | 36 | 31 | 39 | 50 | 54 |

[Evaluation Results]

Table-1 provides the following indications.

In Comparative Examples 1, 3, and 6, in which no polysiloxane was included, the feel was poor.

In Example 4, as a result of the inclusion of a propylene-based polymer that serves as the component (A), a hydrogenated block copolymer that serves as the component (B), and an aryl-group-containing organopolysiloxane that serves as the component (C), the feel was excellent, and the transparency was also high compared with Comparative Examples 4, 5 and 8, in which a dimethyl polysiloxane alone was included.

Although the present invention has been described in detail with reference to particular embodiments, it will be apparent to those skilled in the art that various changes may be made thereto without departing from the spirit and scope of the present invention.

The present application is based on Japanese Patent Application No. 2020-013855 filed on Jan. 30, 2020 and Japanese Patent Application No. 2020-172653 filed on Oct. 13, 2020, which are herein incorporated in their entireties by reference.

INDUSTRIAL APPLICABILITY

Molded articles produced from the thermoplastic elastomer composition of the present invention have excellent transparency and feel and are, therefore, suitable for use in automotive parts, such as automotive interior components, and in building components, medical components, wire cover materials, sundries, and the like.

The invention claimed is:

1. A thermoplastic elastomer composition comprising components (A) to (C), listed below,
component (A): a propylene-based polymer;
component (B): a block copolymer and/or a hydrogenated product thereof, the block copolymer including at least two polymer blocks P and at least one polymer block Q, the at least two polymer blocks P primarily including aromatic vinyl compound units, the at least one polymer block Q primarily including conjugated diene compound units; and
component (C): an aryl-group-containing organopolysiloxane,
wherein the component (C) comprises an aralkyl-group-containing organopolysiloxane.

2. The thermoplastic elastomer composition according to claim 1, wherein the component (C) is an aralkyl-group-containing organopolysiloxane including repeating units represented by formula (1) below,

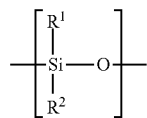

general formula (1)

where $R^1$ represents a hydrocarbon group having 1 to 18 carbon atoms, and $R^2$ represents an aralkyl group having 7 to 12 carbon atoms.

3. A thermoplastic elastomer composition according to claim 2, wherein $R^1$ is a methyl group.

4. A molded article prepared by using the thermoplastic elastomer composition according to claim 1.

5. A molded article including the thermoplastic elastomer composition according to claim 1.

6. The thermoplastic elastomer composition according to claim 1, wherein the propylene-based polymer comprises a propylene homopolymer.

7. The thermoplastic elastomer composition according to claim 1, wherein the propylene-based polymer comprises a propylene-ethylene copolymer.

8. The thermoplastic elastomer composition according to claim 1, wherein a melt flow rate of the propylene-based polymer is 0.05 to 200 g/10 minutes.

9. The thermoplastic elastomer composition according to claim 1, wherein the aromatic vinyl compound units comprise at least one selected from the group consisting of styrene, a-methylstyrene, p-methylstyrene, divinylbenzene, 1,1-diphenylethylene, N,N-dimethyl-p-aminoethylstyrene, and N,N-diethyl-p-aminoethylstyrene.

10. The thermoplastic elastomer composition according to claim 1, wherein the conjugated diene compound units comprise at least one selected from the group consisting of 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene.

11. The thermoplastic elastomer composition according to claim 1, wherein a content of the block P in the block copolymer is 70 mass % or less.

12. The thermoplastic elastomer composition according to claim 1, wherein a content of the block Q in the block copolymer is 30 mass % or more and 95 mass % or less.

13. The thermoplastic elastomer composition according to claim 1, wherein a weight average molecular weight (Mw) of the hydrogenated block copolymer is 10,000 or more and 30,000 or less.

14. The thermoplastic elastomer composition according to claim 2, wherein the aralkyl group having 7 to 12 carbon atoms comprises at least one selected from the group consisting of benzyl groups, phenylethyl groups, phenylpropyl groups, and 2-phenylpropyl groups.

15. The thermoplastic elastomer composition according to claim 1, wherein a content of an aralkyl group of the aralkyl-group-containing organopolysiloxane is 1 to 60 mol %.

16. The thermoplastic elastomer composition according to claim 1, wherein a kinematic viscosity (25° C.) of the aralkyl-group-containing organopolysiloxane is 1 cSt or more and 1,500,000 cSt or less.

17. The thermoplastic elastomer composition according to claim 1, wherein the thermoplastic elastomer composition further comprises a hydrocarbon-based softening agent.

* * * * *